(12) United States Patent
Kitagawa et al.

(10) Patent No.: US 9,685,648 B2
(45) Date of Patent: Jun. 20, 2017

(54) BUS BAR ATTACHMENT DEVICE AND BUS BAR ATTACHMENT METHOD

(71) Applicants: Nissan Motor Co., Ltd., Yokohama-shi, Kanagawa (JP); Automotive Energy Supply Corporation, Zama-shi, Kanagawa (JP)

(72) Inventors: Shinichiro Kitagawa, Atsugi (JP); Hiroyuki Nakazawa, Yokohama (JP)

(73) Assignees: Nissan Motor Co., Ltd., Yokohama (JP); Automotive Energy Supply Corporation, Zama (JP)

( * ) Notice: Subject to any disclaimer, the term of this patent is extended or adjusted under 35 U.S.C. 154(b) by 282 days.

(21) Appl. No.: 14/380,094

(22) PCT Filed: Mar. 1, 2013

(86) PCT No.: PCT/JP2013/055727
§ 371 (c)(1),
(2) Date: Aug. 21, 2014

(87) PCT Pub. No.: WO2013/146097
PCT Pub. Date: Oct. 3, 2013

(65) Prior Publication Data
US 2015/0013150 A1 Jan. 15, 2015

(30) Foreign Application Priority Data
Mar. 29, 2012 (JP) ................................. 2012-075688

(51) Int. Cl.
*H01M 2/20* (2006.01)
*H01M 2/10* (2006.01)
*H01M 10/04* (2006.01)

(52) U.S. Cl.
CPC ............... *H01M 2/20* (2013.01); *H01M 2/10* (2013.01); *H01M 2/202* (2013.01);
(Continued)

(58) Field of Classification Search
None
See application file for complete search history.

(56) References Cited

U.S. PATENT DOCUMENTS

2010/0281681 A1* 11/2010 Rourke ................. H01M 2/206
29/623.1
2012/0003520 A1* 1/2012 Lee ..................... H01M 2/1022
429/83

FOREIGN PATENT DOCUMENTS

JP 7-57843 A 3/1995
JP 2006-302715 A 11/2006
(Continued)

OTHER PUBLICATIONS

Definition of adjacent. Dictionary.com <<http://www.dictionar.com/browse/adjacent?2=t>> Accessed Dec. 21, 2016.*

*Primary Examiner* — Alix Eggerding
(74) *Attorney, Agent, or Firm* — Global IP Counselors, LLP

(57) ABSTRACT

A bus bar attachment device includes a bus bar placing part for placing a bus bar onto a pallet, and a pressing part for causing first and second adjacent surfaces in the bus bar placed by the bus bar supply part to press against first and second adjacent wall surfaces in a bus bar positioning part of the pallet. The bus bar is placed by the bus bar supply part in a position where the first and second surfaces face the first and second wall surfaces in the bus bar positioning part, and the first and second surfaces are pressed the pressing part against the first and second wall surfaces in the bus bar positioning part to set the position of the bus bar relative to a battery.

19 Claims, 15 Drawing Sheets

(52) U.S. Cl.
CPC ...... *H01M 10/0404* (2013.01); *H01M 2/1061* (2013.01); *Y10T 29/49108* (2015.01); *Y10T 29/53135* (2015.01)

(56) References Cited

FOREIGN PATENT DOCUMENTS

| | | |
|---|---|---|
| JP | 2007-42578 A | 2/2007 |
| JP | 2008-4366 A | 1/2008 |
| JP | 2009-231267 A | 10/2009 |
| WO | 2006/046585 A1 | 5/2006 |

\* cited by examiner

US 9,685,648 B2

BUS BAR ATTACHMENT DEVICE AND BUS BAR ATTACHMENT METHOD

CROSS-REFERENCE TO RELATED APPLICATIONS

This application is a U.S. National stage application of International Application No. PCT/JP2013/055727, filed Mar. 1, 2013, which claims priority to Japanese Patent Application No. 2012-075688 filed in Japan on Mar. 29, 2012, the contents of each of which are hereby incorporated herein by reference.

BACKGROUND

Field of the Invention

The present invention relates to a bus bar attachment device and a bus bar attachment method applied to a battery.

Background Information

Recently, in various batteries such as automobile batteries, solar batteries, and electronic device batteries, flat batteries are used in which a battery element is sealed by an outer member made from a laminate and an electrode terminal is led out from the outer member to the exterior. Japanese Laid-Open Patent Application No. 2009-231267, for example, discloses a battery module in which a plurality of flat batteries are electrically connected in series or in parallel. A bus bar for guiding current to the electrode terminals of the battery module is connected to electrode tabs extending from the flat batteries.

SUMMARY

When a bus bar is attached to electrode tabs, the bus bar must be positioned relative to the electrode tabs with high precision. The position of the bus bar relative to the electrode tabs can be set with high precision by equipment such as a high-precision robot. However, in order for the bus bar to be positioned with high precision using equipment such as a high-precision robot, the actuating speed of the equipment such as a robot must be comparatively low. Equipment such as a high-precision robot is also comparatively high in cost. Therefore, the work of attaching the bus bar to the battery is inhibited from being done faster and being made less expensive, and it is consequently difficult to make the manufacturing of the battery more efficient.

The present invention was devised in order to resolve the problems described above, and an object of the invention is to provide a bus bar attachment device and a bus bar attachment method whereby the work of attaching the bus bar to the battery can be done faster and made less expensive, and the bus bar can be positioned relative to the battery with high precision.

A bus bar attachment device according to the present invention comprises a pallet on which is placed a battery from which an electrode tab extends out, a battery positioning part for setting the position of the battery relative to the pallet, the battery positioning part being provided to the pallet, and a bus bar positioning part for setting the position, relative to the pallet, of a bus bar electrically connected to the electrode tab, the bus bar positioning part being disposed on the pallet and having two adjacent wall surfaces against which two adjacent surfaces in the bus bar press. The bus bar attachment device further comprises a bus bar placing part for placing the bus bar onto the pallet, and a pressing part for causing the two adjacent surfaces in the bus bar placed by the bus bar placing part to press against the two adjacent wall surfaces in the bus bar positioning part of the pallet. The bus bar is placing by the bus bar placing part in a position where the two surfaces face the two wall surfaces in the bus bar positioning part, and the two surfaces are pressed by the pressing part against the two wall surfaces in the bus bar positioning part to set the position of the bus bar relative to the battery.

A bus bar attachment method of the present invention comprises a placement step for placing, on a pallet, a battery from which an electrode tab extends out with the position relative to the pallet having been set, a placing step for placing a bus bar, which is electrically connected to the electrode tab, in a position where two adjacent surfaces in the bus bar face two adjacent wall surfaces in a bus bar positioning part provided to the pallet for setting the position of the bus bar relative to the pallet. The bus bar attachment method further comprises a positioning step for causing the two adjacent surfaces in the placed bus bar to press against the two adjacent wall surfaces in the bus bar positioning part to set the position of the bus bar relative to the battery.

BRIEF DESCRIPTION OF THE DRAWINGS

Referring now to the attached drawings which form a part of this original disclosure.

DETAILED DESCRIPTION OF EMBODIMENTS

Figure 1:
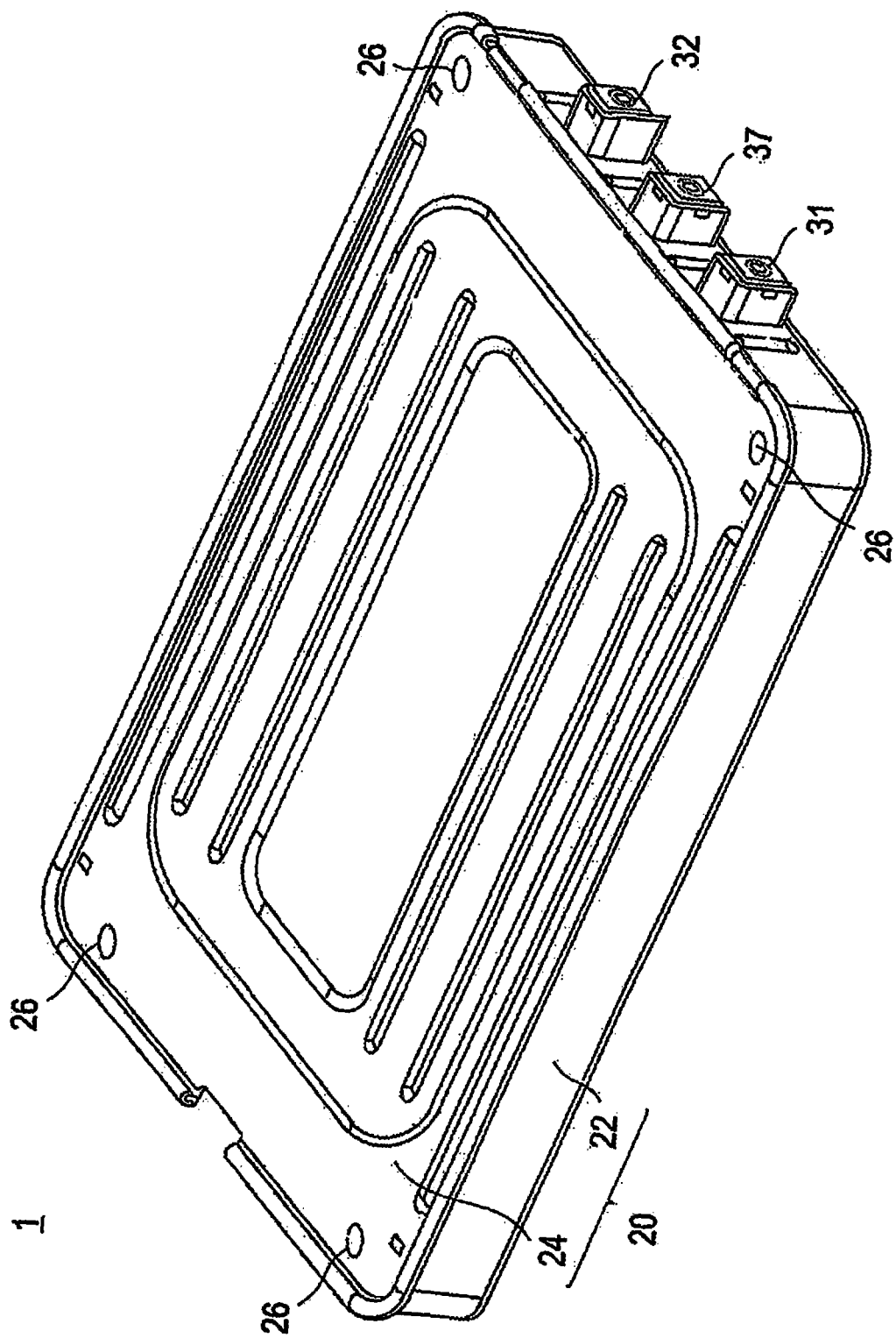
FIG. 1 is a plan view showing a battery module.

An embodiment of the present invention is described below with reference to the accompanying drawings. In the description of the drawings, the same elements are denoted by the same symbols, and redundant descriptions are omitted. The dimensional ratios in the drawings are exaggerated for convenience in the description and are different from the actual ratios.

Figure 2:
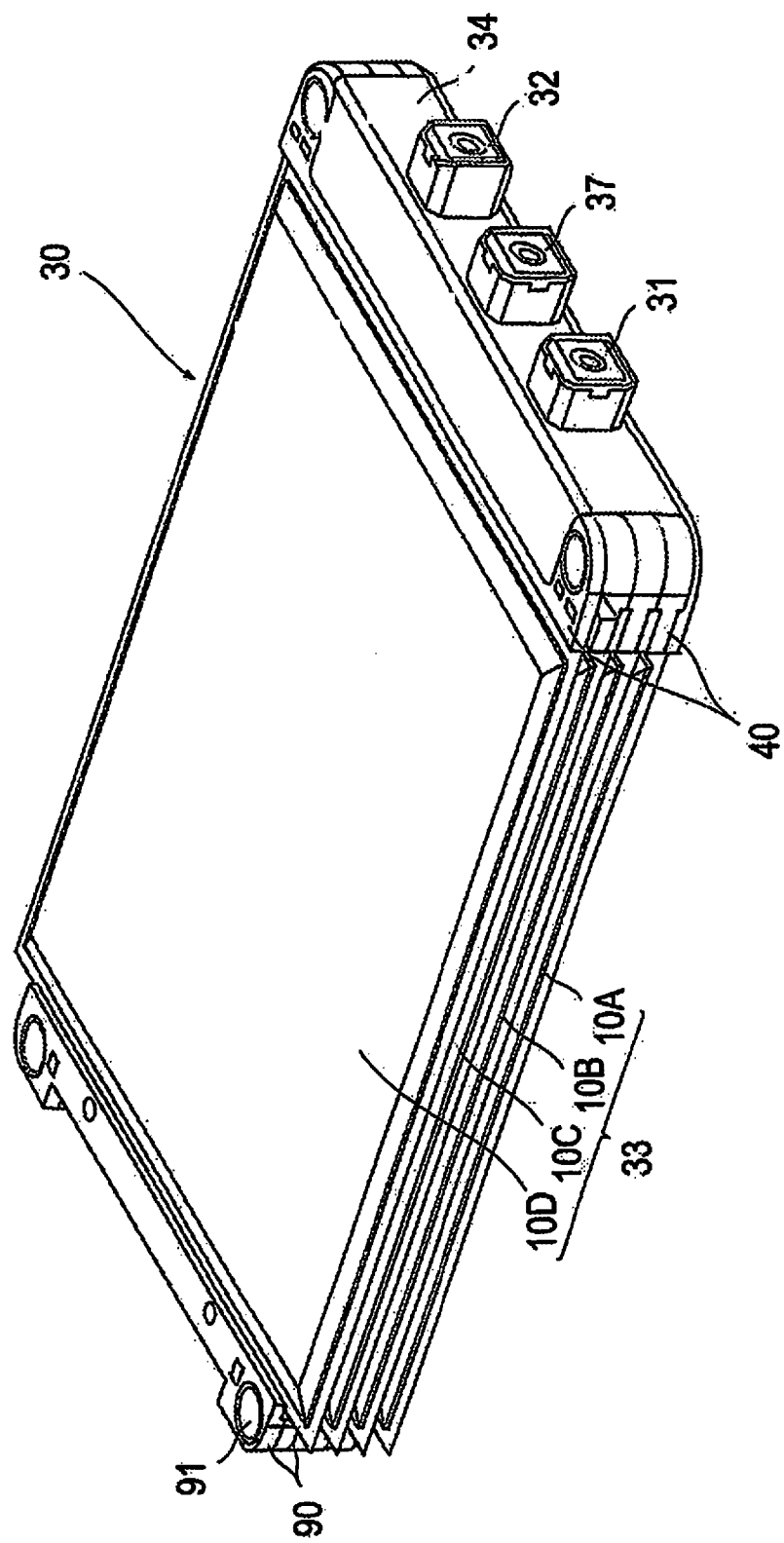
FIG. 2 is a perspective view showing a cell unit inside a case of the battery module.

Referring to FIGS. 1 and 2, in a battery module 1, a cell unit 30 including a plurality (four in the present embodiment) of flat batteries 10 (10A to 10D) connected in series or in parallel, and an insulating cover 34 having the property of electrical insulation, are stored inside a case 20. The battery module 1 can be used separately; for example, an assembled battery suitable for the desired current, voltage, and capacity can be formed by linking a plurality of battery modules 1 in series or in parallel.

The case 20 has a lower case 22 having a substantially triangular box shape, and an upper case 24 having a lid. The edge of the upper case 24 is connected to the peripheral wall edge of the lower case 22 by crimping, and the lower case 22 and the upper case 24 are formed from comparatively thin steel plates or aluminum plates. The lower case 22 and the upper case 24 have through-holes 26. The through-holes 26 are disposed in four locations in the corners, and are used in order to insert through-bolts (not shown) for stacking a plurality of battery modules 1 together to form an assembled battery. The symbols 31 and 32 are output terminals disposed so as to protrude from openings in the front surface of the lower case 22.

The cell unit 30 has a stacked assembly 33 in which a plurality of flat batteries 10 are electrically connected and stacked, and a plurality of spacers 40, 90 for supporting the batteries. An electrically insulating resin material can be used for the spacers 40, 90. The spacers 40 are disposed on the front surface side of the stacked assembly 33, and the spacers 90 are disposed on the rear surface side of the stacked assembly 33.

Figure 3:
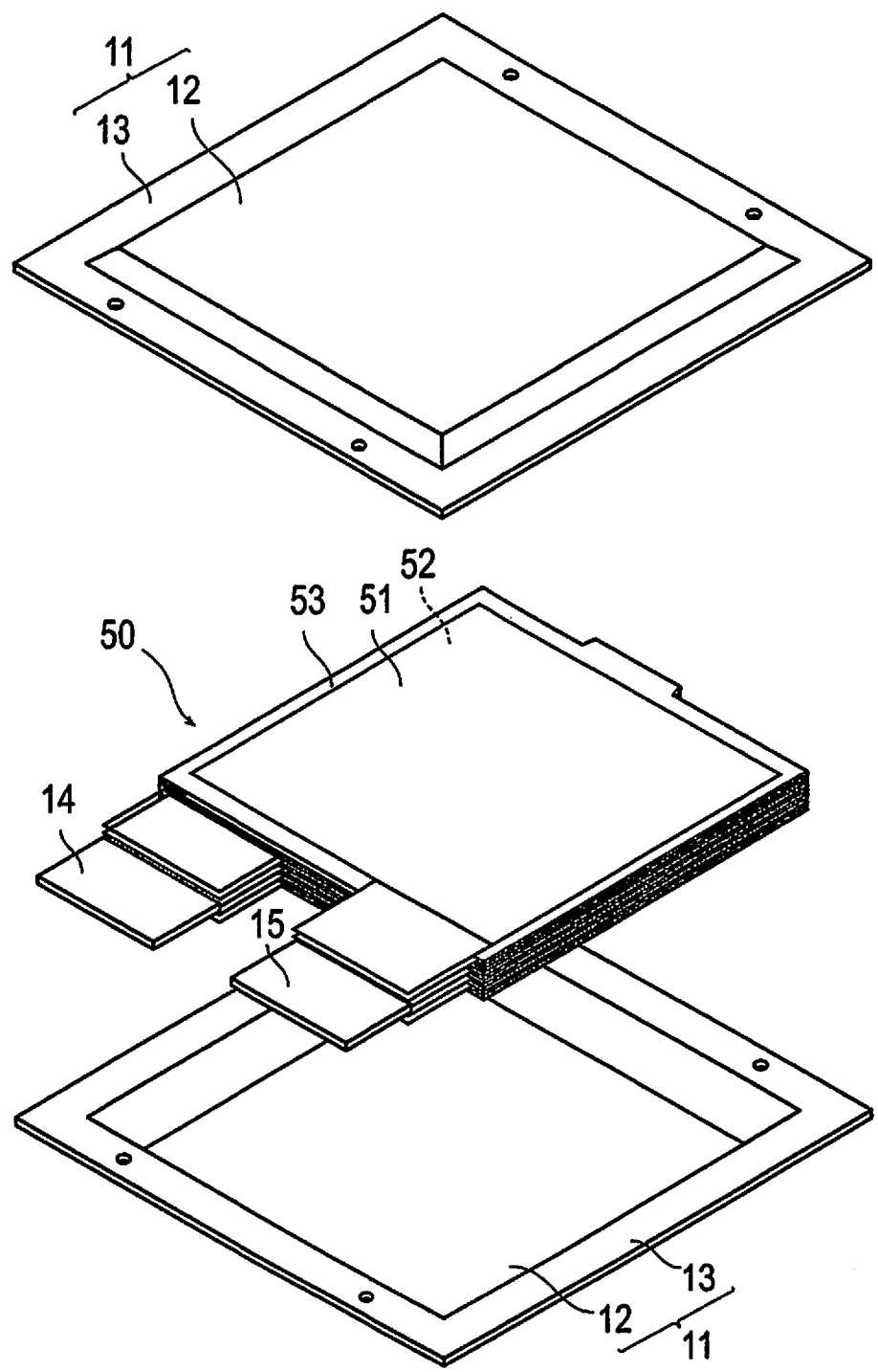
FIG. 3 is an exploded perspective view showing a flat battery.

The flat batteries 10 are lithium ion secondary batteries, each including, for example, a stacked electrode assembly 50 stored together with an electrolyte solution in an outer member 11, as shown in FIG. 3. Each flat battery 10 has a positive electrode tab 14 (an electrode tab) and a negative electrode tab 15 (an electrode tab) extending out from the outer member 11 to the exterior.

The stacked electrode assembly 50 is formed by sequentially stacking a positive electrode 51, a negative electrode 52, and a separator 53. The positive electrode 51 has a positive electrode active material composed of a lithium-transition metal composite oxide such as $LiMn_2O_4$, for example. The negative electrode 52 has a negative electrode active material composed of carbon and a lithium-transition metal composite oxide, for example. The separator 53 is formed from porous polyethylene (PE) having a permeability such that, for example, electrolytes can pass through.

The outer member 11 is composed of a sheet material such as a polymer-metal composite laminate film in which a metal (including alloys) such as aluminum, stainless steel, nickel, or copper is coated with an insulator such as a polypropylene film, from the standpoint of weight reduction and thermal conductivity. The outer member 11 has a main body section 12 for covering the stacked electrode assembly 50 and an outer peripheral section 13 extending around the peripheral edge of the main body section 12, and part or all of the outer peripheral section 13 is bonded by heat fusion.

The spacers 40 have through-holes 41 at both ends in the longitudinal deceleration. The through-holes 41 are positionally aligned with the through-holes 26 in the front surface sides of the lower case 22 and the upper case 24, and are used in order to insert the through-bolts. The spacers 90 have through-holes 91 at both ends in the longitudinal deceleration. The through-holes 91 are positionally aligned with the through-holes 26 in the rear surface sides of the lower case 22 and the upper case 24, and are used in order to insert the through-bolts.

The positive electrode tab 14 and the negative electrode tab 15 are members for drawing current from the stacked electrode assembly 50, and these tabs extend in one side of the flat battery 10.

Figure 4:
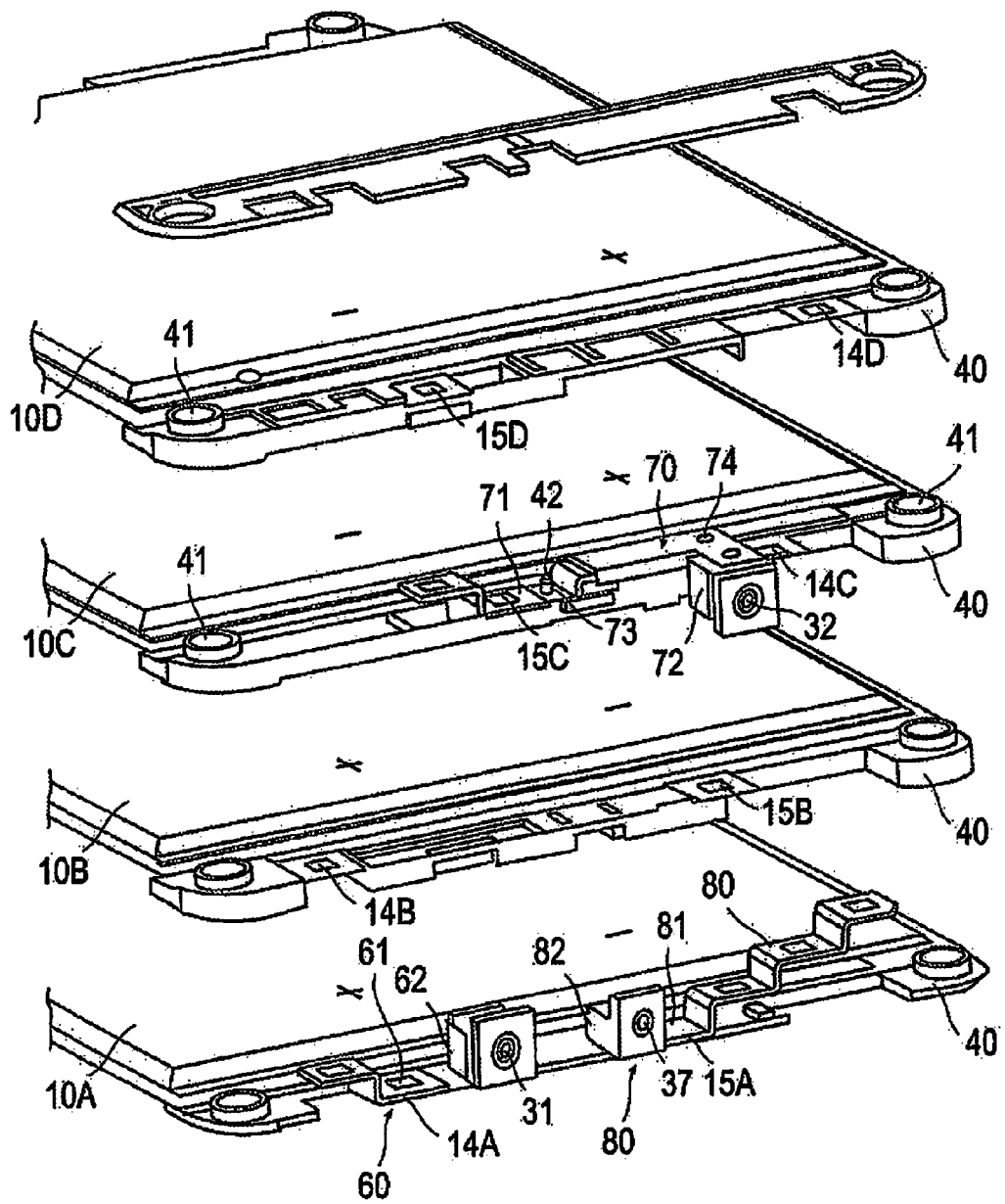
FIG. 4 is an exploded perspective view showing the internal configuration of the battery module.

As shown in FIG. 4, positive electrode tabs 14A, 14B of a first flat battery 10A and a second flat battery 10B are bonded by ultrasonic welding or the like with a bus bar 60 electrically connected with an external output positive electrode terminal 31. Negative electrode tabs 15A, 15B of the first flat battery 10A and the second flat battery 10B, together with positive electrode tabs 14C, 14D of a third flat battery 10C and a fourth flat battery 10D, are bonded by ultrasonic welding or the like with a bus bar 80 electrically connected with a voltage detection terminal 37. Negative electrode tabs 15C, 15D of the third flat battery 10C and the fourth flat battery 10D are bonded by ultrasonic welding or the like with a bus bar 70 electrically connected with an external output negative electrode terminal 32.

Figure 5:
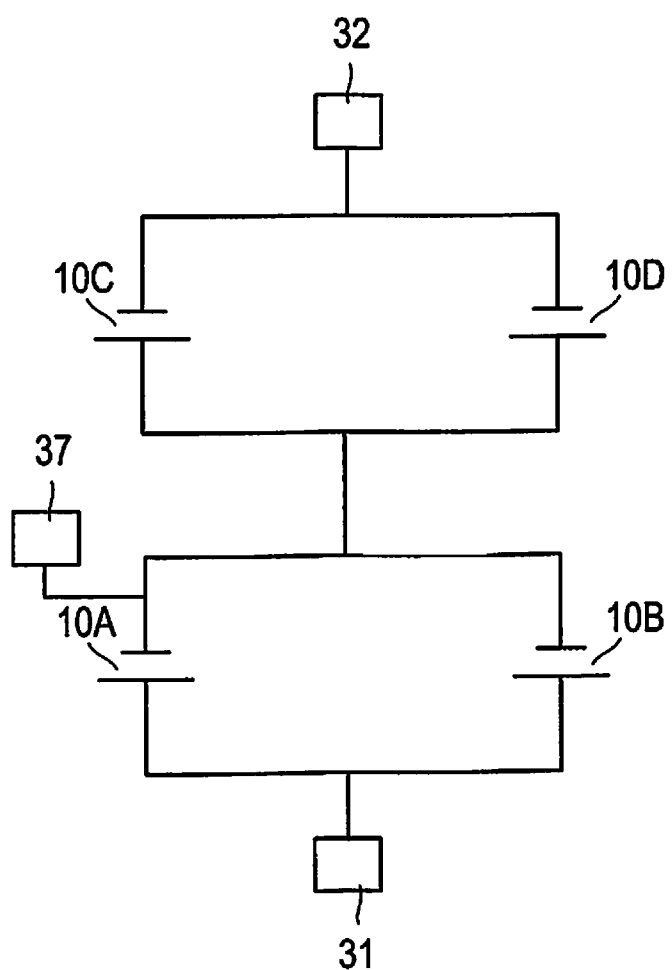
FIG. 5 is a drawing showing the electrical connecting configuration of the plurality of flat batteries constituting the battery module.

Thus, the electrode tabs 14A to 14D and 15A to 15D of the flat batteries 10A to 10D are connected respectively to the external output positive electrode terminal 31, the external output negative electrode terminal 32, and the voltage detection terminal 37 via the bus bars 60, 70, 80, whereby the flat batteries 10A to 10D form a double-parallel, double-series connection configuration as shown in FIG. 5.

The voltage detection terminal 37 is a terminal used in order to detect the voltages of the flat batteries 10A to 10D constituting the battery module 1. Specifically, the voltages of the first flat battery 10A and the second flat battery 10B can be detecting by using the external output positive electrode terminal 31 and the voltage detection terminal 37 and measuring the voltage between these terminals. The voltages of the third flat battery 10C and the fourth flat battery 10D can be detecting by using the external output negative electrode terminal 32 and the voltage detection terminal 37 and measuring the voltage between these terminals.

The bus bars 60, 80 are secured to the spacer 40 attached to the first flat battery 10A, and the bus bar 70 is secured to the spacer 40 attached to the third flat battery 10C, as shown in FIG. 4.

Figure 12:
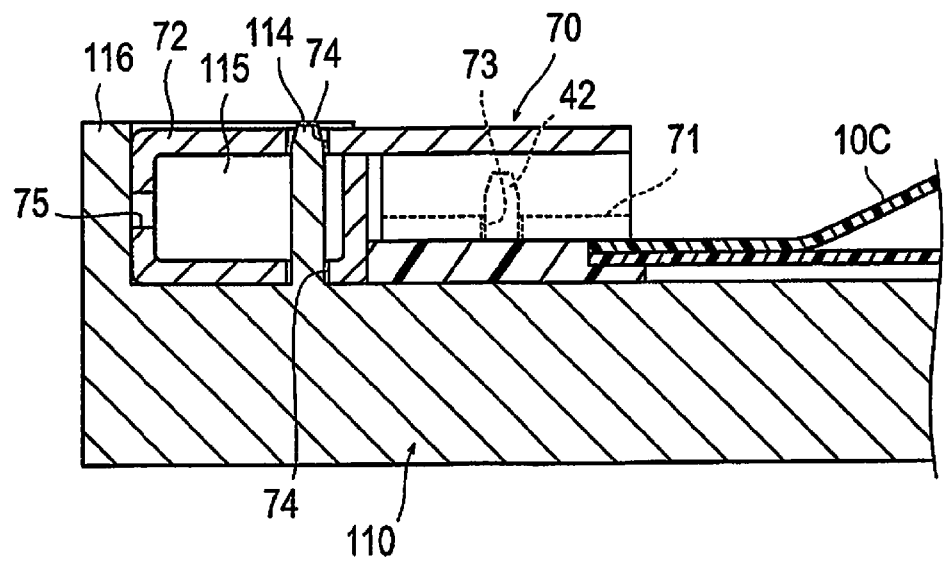
FIG. 12 is a cross-sectional view along line 12-12 of FIG. 11.

The bus bar 70 comprises an installation part 71 in contact with the spacer 40, and a terminal part 72 that functions as the external output negative electrode terminal 32. In the installation part 71 of the bus bar 70 is formed a first pin hole 74 through which a first pin member 114 (see FIGS. 8A, 8B, and 9) formed in a pallet 110 (described hereinafter) is passed. Also formed in the installation part 71 is a second pin hole 73 through which a second pin member 42 (see FIGS. 12 and 14) formed in the spacer 40 is passed.

Next, a bus bar attachment device 100 according to the present embodiment will be described.

The bus bar attachment device 100 is a device for attaching the bus bar 70 to the flat battery 10 (referred to below simply as the "battery 10") to which the spacer 40 is attached. A case of attaching the bus bar 70, one of the three bus bars 60, 70, 80, is described herein as an example. The bus bar 70 is electrically connected to the negative electrode tabs 15C, 15D of the electrode tabs 14A to 14D and 15A to 15D.

To give an outline referring to FIGS. 6 to 10, the bus bar attachment device 100 has a pallet 110 for placing the battery 10C in which the negative electrode tab 15C extends out, a spacer securing pin 111 (equivalent to the battery positioning part) which is disposed on the pallet 110 and which settles the position of the battery 10C relative to the pallet 110, a bus bar positioning part 113 which is disposed on the pallet 110 and which settles the position of the bus bar 70 relative to the pallet 110, the bus bar being electrically connected to the negative electrode tab 15C, a bus bar placing part 120 for placing the bus bar 70 onto the pallet 110, a pressing part 130 for causing the bus bar 70 placed by the bus bar placing part 120 to press against the bus bar positioning part 113, and a conveying part 140 for holding and conveying the pallet 110. The bus bar positioning part 113 comprises two adjacent wall surfaces (a first side surface 116A and a third side surface 116C, a second side surface 116B and the third side surface 116C, or the third side surface 116C and a bottom surface 117) that two adjacent surfaces of the bus bar 70 press against. The pressing part 130 causes two adjacent surfaces in the bus bar 70 to press against two adjacent wall surfaces in the bus bar positioning part 113. In this bus bar attachment device 100, the bus bar 70 is placed by the bus bar placing part 120 in a position where the two surfaces face the two wall surfaces in the bus bar positioning part 113, and the pressing part 130 causes the two surfaces to press against the two wall surfaces in the bus bar positioning part 113 and settles the positions of the two surfaces relative to the battery 10C. In the embodiment depicted, the battery 10C comprises a spacer 40 laid over and attached to an electrode tab. The spacer securing pin 111 settles the position of the spacer 40 relative to the pallet 110 and thereby settles the position of the battery 10C relative to the pallet 110. The bus bar placing part 120 places the bus bar 70 onto the spacer 40 of the battery 10C placed on the pallet 110. The details are described below.

Figure 8A:
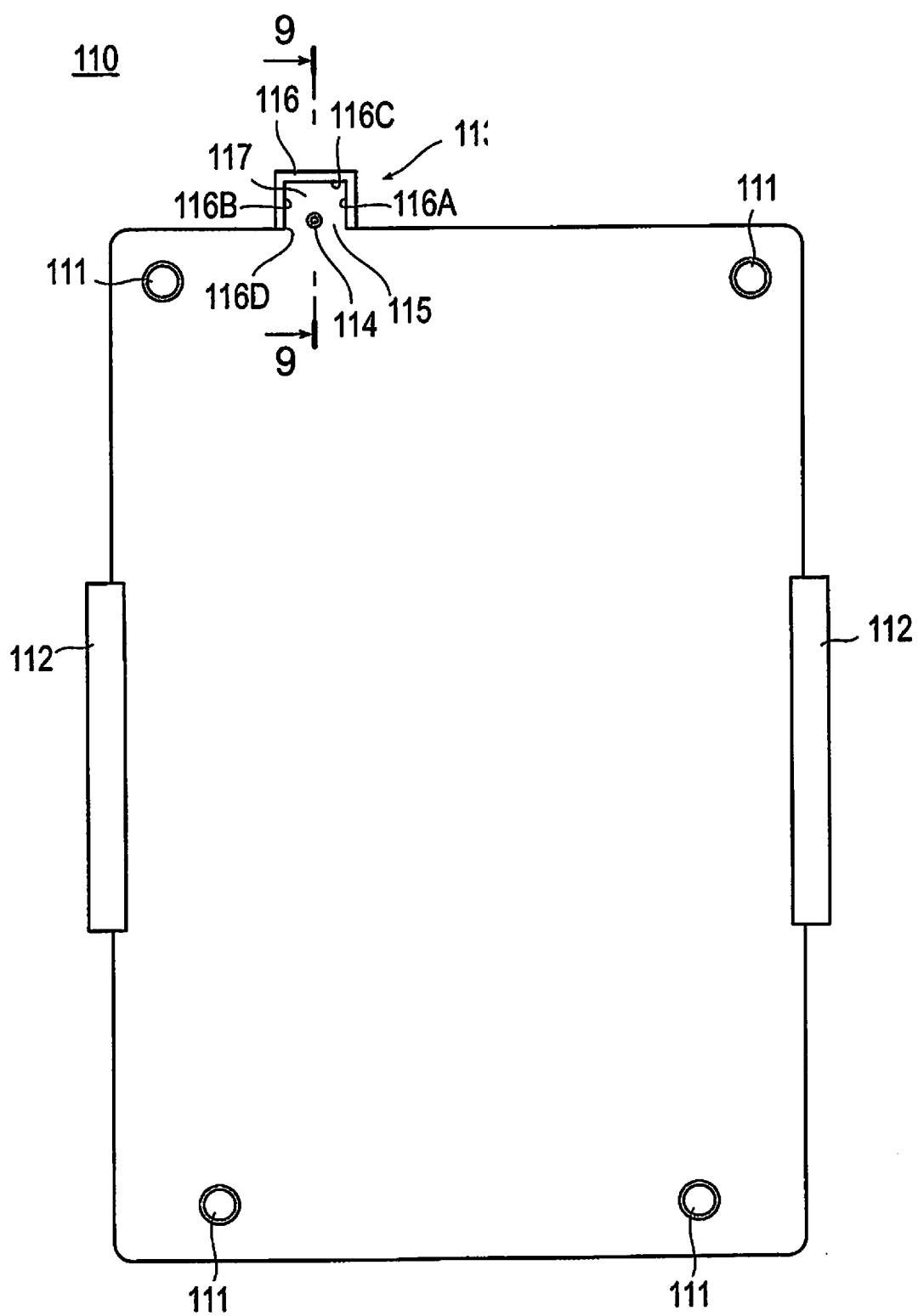
FIG. 8A is a plan view showing a pallet of a bus bar attachment device according to an embodiment.
Figure 9:
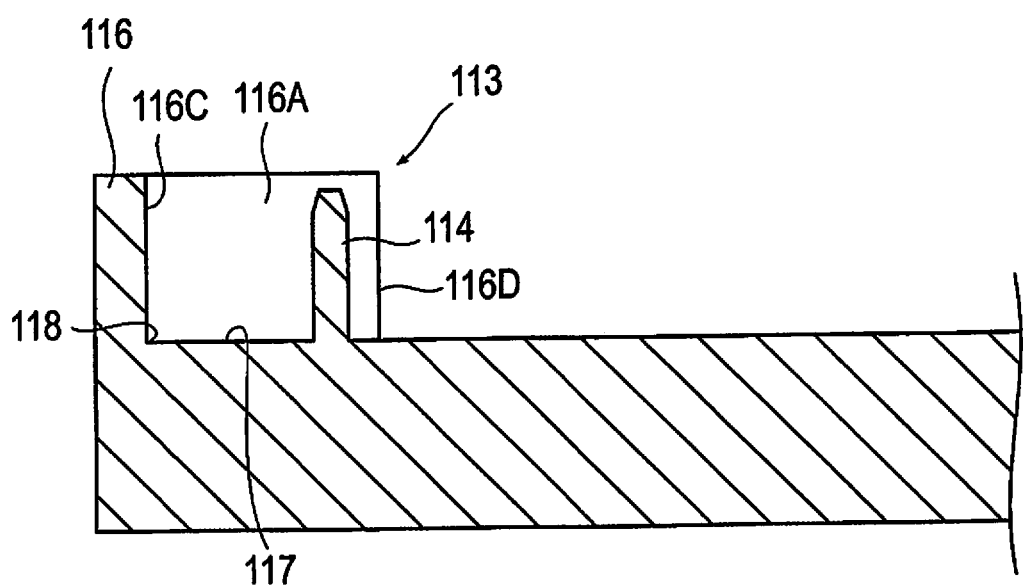
FIG. 9 is a cross-sectional view along line 9-9 of FIG. 8A.
Figure 11:
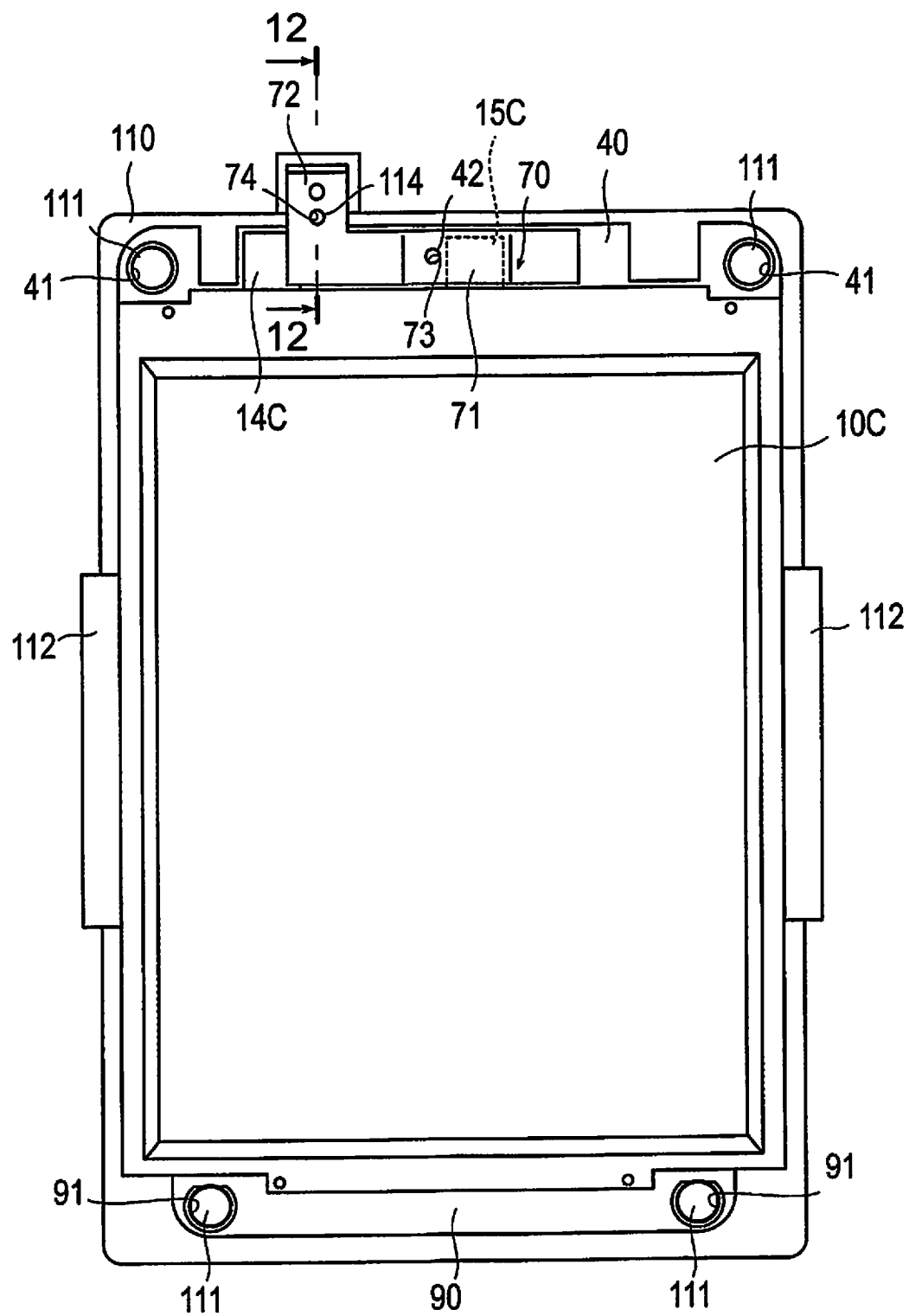
FIG. 11 is a front view showing a state in which the positions of a flat battery and a bus bar have been set relative to the pallet of the bus bar attachment device according to an embodiment.

The pallet 110 comprises the spacer securing pin 111 for inserting into the through-holes 41, 91 of the spacers 40, 90 and securing the spacers 40, 90, battery holding parts 112 for holding the pallet in contact with the side ends of the battery 10C, and the bus bar positioning part 113 for positioning the bus bar 70, as shown in FIGS. 8A, 9, and 11. The pallet 110 has the first pin member 114 inserted into the first pin hole 74 formed in the bus bar 70. The spacer 40 has the second pin member 42 inserted into the second pin hole 73 formed in the bus bar 70. The bus bar positioning part 113 has a fitting part 115 in which the terminal part 72 of the bus bar 70 is fitted. The first pin member 114 is disposed in proximity to the fitting part 115.

The fitting part 115 has a substantially U-shaped side wall 116 rising up from the surface of the pallet 110 that carries the battery 10C, and a bottom surface 117 enclosed by the side wall 116. In the inner sides of the side wall 116 are formed the opposing first side surface 116A and second side surface 116B, and the third side surface 116C positioned between the first side surface 116A and the second side surface 116B. The first to third side surfaces 116A to 116C and the bottom surface 117 constitute wall surfaces that are in contact with the terminal part 72 of the bus bar 70. An angle part 118 rising up at approximately 90 degrees is formed between the bottom surface 117 and the third side surface 116C.

Figure 8B:
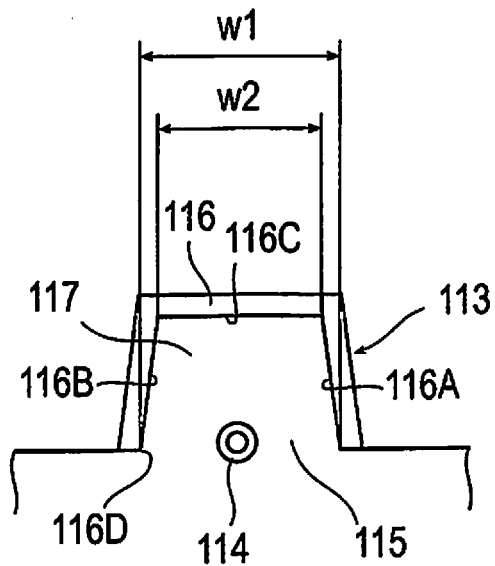
FIG. 8B is a plan view showing an exaggeration of the tapered shape of a bus bar positioning part.

The first side surface 116A and the second side surface 116B, as seen in the plan view shown in FIG. 8A, have a tapered shape in which there is a slight taper from an inlet port 116D of the fitting part 115 to the third side surface 116C. FIG. 8B is an exaggerated depiction of the tapered shape of the bus bar positioning part 113. The width dimension in the inlet port 116D of the fitting part 115 is w1, and the width dimension in the third side surface 116C is w2 (w1>w2). Thus, the bus bar positioning part 113 has a substantially U-shaped side wall 116 rising up from the surface of the pallet 110 that carries the battery 10C, and has a tapered shape in which a taper is formed from the inlet port 116D opened in the side wall 116 to the side surface (the third side surface 116C) that faces the inlet port 116D. This tapered shape makes it easy for the terminal part 72 of the bus bar 70 to be led into the fitting part 115 through the inlet port 116D.

The bus bar positioning part 113 comprises two adjacent wall surfaces which two adjacent surfaces in the bus bar 70 press against. Two adjacent surfaces in the terminal part 72 of the bus bar 70 press against two adjacent wall surfaces in the fitting part 115: the first side surface 116A and the third side surface 116C, and another two adjacent surfaces in the terminal part 72 of the bus bar 70 press against two adjacent wall surfaces in the fitting part 115: the second side surface 116B and the third side surface 116C, whereby the position of the bus bar 70 in the width direction (the position in the left-to-right direction in FIGS. 8A and 8B) relative to the pallet is set, and the lateral position (the position in the upward direction in FIGS. 8A and 8B) of the bus bar 70 relative to the pallet 110 is set. The other two adjacent surfaces in the terminal part 72 of the bus bar 70 press against two adjacent wall surfaces in the fitting part 115: the third side surface 116C and the bottom surface 117, whereby the height position (the position in the upward direction in FIG. 9) of the bus bar 70 relative to the pallet is set, and the lateral position (the position in the leftward direction in FIG. 9) of the bus bar 70 relative to the pallet 110 is set.

Figure 10:
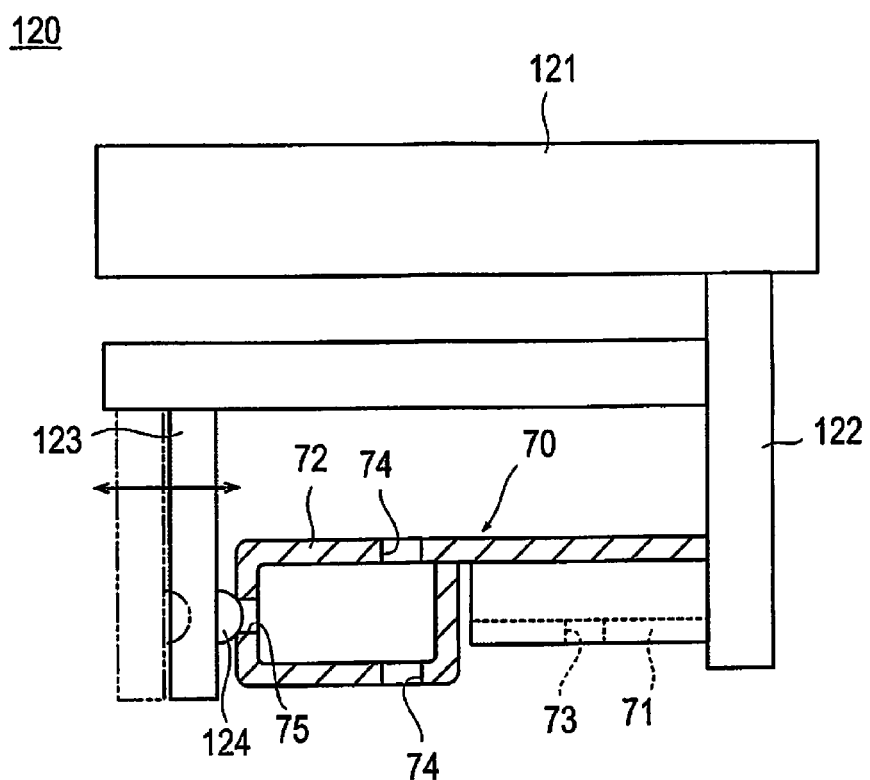
FIG. 10 is a schematic configuration drawing showing a bus bar placing part of a bus bar attachment device according to an embodiment.

Referring to FIG. 10, the bus bar placing part 120 is configured from equipment such as a robot, for example. A robot hand 121 takes one bus bar 70 at a time from a plurality stored in and supplied from a tray or the like, and places the bus bar onto the pallet 110. The robot hand 121 has a stationary hand part 122 and a movable hand part 123 capable of moving toward and away from the stationary hand part 122, the terminal part 72 is gripped between the stationary hand part 122 and the movable hand part 123, and the bus bar 70 is placed onto the spacer 40. The movable hand part 123 includes a clamp 124 for holding a portion of a nut hole 75 in the terminal part 72 of the bus bar 70. The clamp 124 has a semispherical shape, part of which fits into the nut hole 75. Due to the clamp 124 fitting into the nut hole 75, the robot hand 121 can reliably grip the terminal part 72 of the bus bar 70 and can placing the bus bar 70 with a stabilized orientation.

The bus bar 70 is supplied by the bus bar placing part 120 in a position where two adjacent surfaces face two wall surfaces (the first side surface 116A and the third side surface 116C, the second side surface 116B and the third side surface 116C, or the third side surface 116C and the bottom surface 117) in the bus bar positioning part 113, and two adjacent surfaces are caused by the pressing part 130 to press against two wall surfaces in the bus bar positioning part 113 to set the position relative to the battery 10C. Because the function of placing the bus bar 70 and the function of positioning the bus bar 70 relative to the battery 10C are carried out by separate means or devices, when the bus bar 70 is placed in a position where two adjacent surfaces face two wall surfaces in the bus bar positioning part 113, the precision whereby the bus bar 70 is positioned relative to the pallet 110 may be comparatively low. Therefore, the bus bar 70 can be placed at a high speed, and the cost of equipment such as the robot placing the bus bar 70 can be reduced.

The bus bar 70 is placed by the bus bar placing part 120 in a position where the first pin member 114 is inserted into the first pin hole 74, whereby two surfaces in the terminal part 72 face two wall surfaces (the first side surface 116A and the third side surface 116C, the second side surface 116B and the third side surface 116C, or the third side surface 116C and the bottom surface 117) in the bus bar positioning part 113.

The bus bar 70 is also placed by the bus bar placing part 120 in a position where the second pin member 42 is inserted into the second pin hole 73, whereby two surfaces in the terminal part 72 face two wall surfaces (the first side surface 116A and the third side surface 116C, the second side surface 116B and the third side surface 116C, or the third side surface 116C and the bottom surface 117) in the bus bar positioning part 113.

A gap of a certain size is formed between the external peripheral surface of the first pin member 114 and the inner peripheral surface of the first pin hole 74, and a gap of a certain size is formed between the external peripheral surface of the second pin member 42 and the inner peripheral surface of the second pin hole 73. The purpose of fitting together the first pin member 114 and the first pin hole 74 and fitting together the second pin member 42 and the second pin hole 73 is not to set the position of the bus bar 70 relative to the pallet 110. The purpose of these fittings is to place the bus bar 70 on the pallet 110 to an extent that the bus bar 70 can be made by the pressing part 130 to press against the bus bar positioning part 113, or in other words, in a comparatively rough state.

The pressing part 130 has a contact part 131 extending above the pallet 110 from a position in a lateral direction Y relative to the conveying direction X of the pallet 110, and the contact part 131 is brought in contact with the bus bar 70 and pulled laterally and downward, whereby two surfaces in the bus bar 70 press against two wall surfaces in the bus bar positioning part 113. More specifically, the pressing part 130 comprises a contact part 131 in contact with the bus bar 70 and used for pressing the bus bar 70, and a drive part 133 having a drive source for moving the contact part 131 linearly. The contact part 131 has a plurality of pawls 132 extending downward, and the bottom ends of the pawls 132 come in contact with the bus bar 70. The drive source of the drive part 133 is a cylinder, a motor, or the like, for example, and is positioned in the lateral direction Y relative to the conveying direction X of the pallet 110. The drive part 133 comprises a drive shaft 134 inclined from a vertical direction Z, and the contact part 131 is moved in the lateral direction Y by moving the contact part 131 downward from above the pallet 110.

Figure 6:
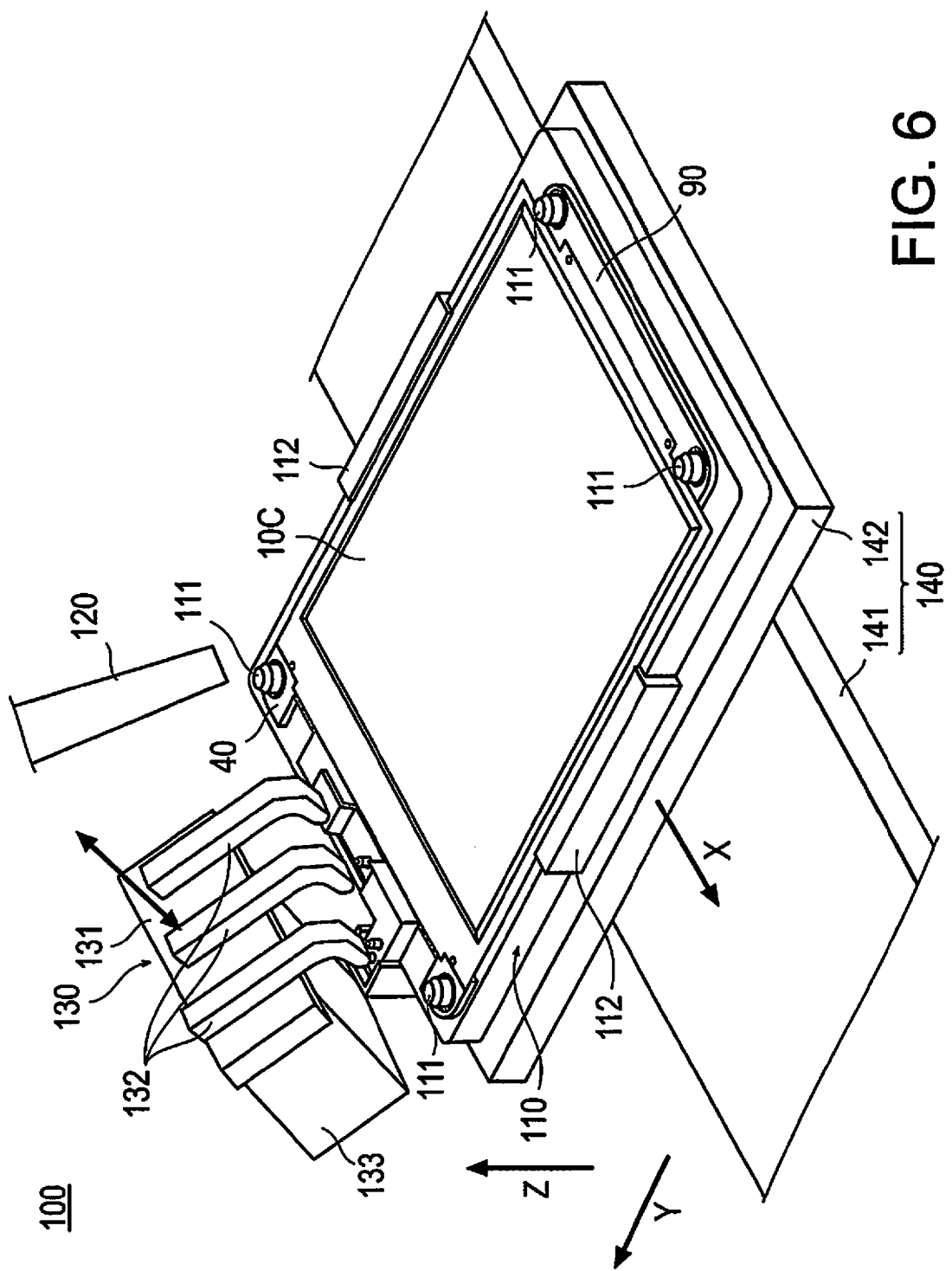
FIG. 6 is a perspective view showing a bus bar attachment device according to an embodiment.
Figure 7:
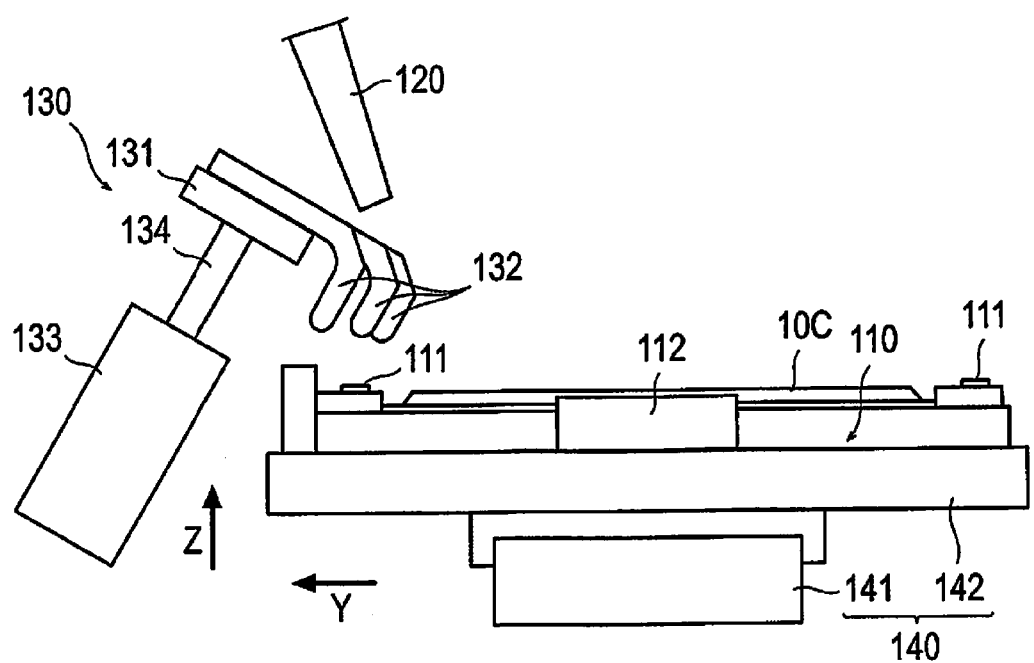
FIG. 7 is a front view showing a bus bar attachment device according to an embodiment.

The conveying part 140 has a pallet holding section 142 which is capable of moving along a guide rail 141 extending substantially horizontally, and which is capable of carrying the pallet 110, as shown in FIGS. 6 and 7. As long as the conveying part 140 is able to convey the pallet 110, the configuration is not limited, and the conveying part may be a conveyor or the like, for example.

Next is a description of the method for attaching the bus bar 70 by means of the bus bar attachment device 100 according to the present embodiment.

In short, attaching the bus bar 70 is performed via a placement step, a placing step, and a positioning step, and in the placement step, the battery 10C in which the negative electrode tab 15C extends out is placed on the pallet 110 in a state such that the position relative to the pallet 110 has been set. In the placing step, the bus bar 70 is placed in a position where two adjacent surfaces in the bus bar 70 face two adjacent wall surfaces in the bus bar positioning part 113. In the positioning step, two adjacent surfaces in the placed bus bar 70 are made to press against two adjacent wall surfaces in the bus bar positioning part 113, and the position of the bus bar 70 relative to the battery 10C is set. The details are described below.

Figure 13:
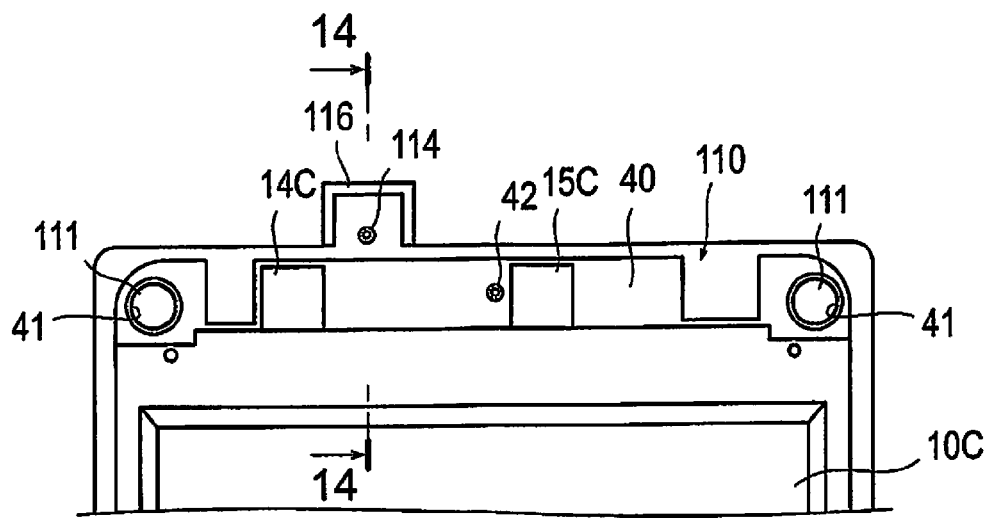
FIG. 13 is a partial plan view showing a state in which a flat battery has been placed on the pallet of the bus bar attachment device according to an embodiment.
Figure 14:
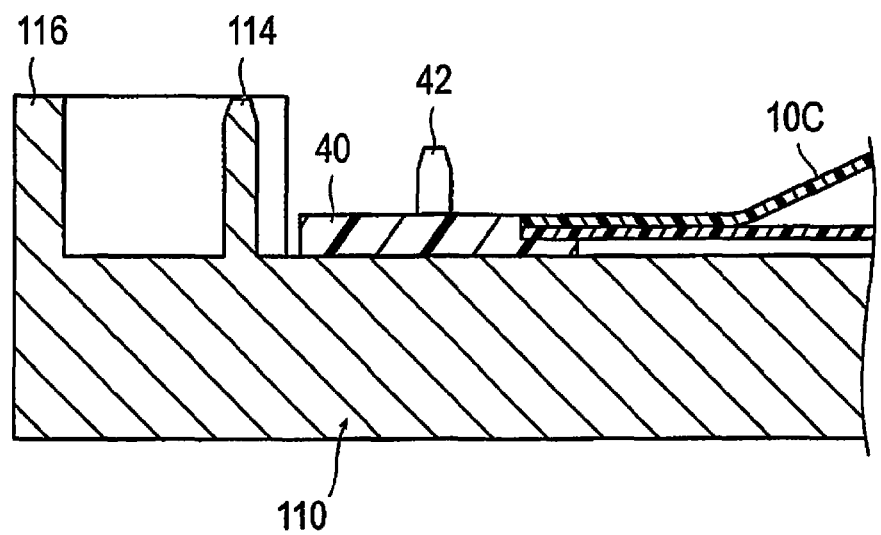
FIG. 14 is a cross-sectional view along line 14-14 of FIG. 13.

In the placement step, the position of the spacer 40 relative to the pallet 110 is set, the spacer being laid on and attached to the negative electrode tab 15C of the battery 10C, whereby the position of the battery 10C relative to the pallet 110 is set. The spacer securing pins 111 of the pallet 110 are passed through the through-holes 41 of the spacer 40, and the battery holding parts 112 of the pallet 110 are brought in contact with the battery 10C, securing the battery 10C with the attached spacer 40 on the pallet 110 as shown in FIGS. 13 and 14.

Figure 15:
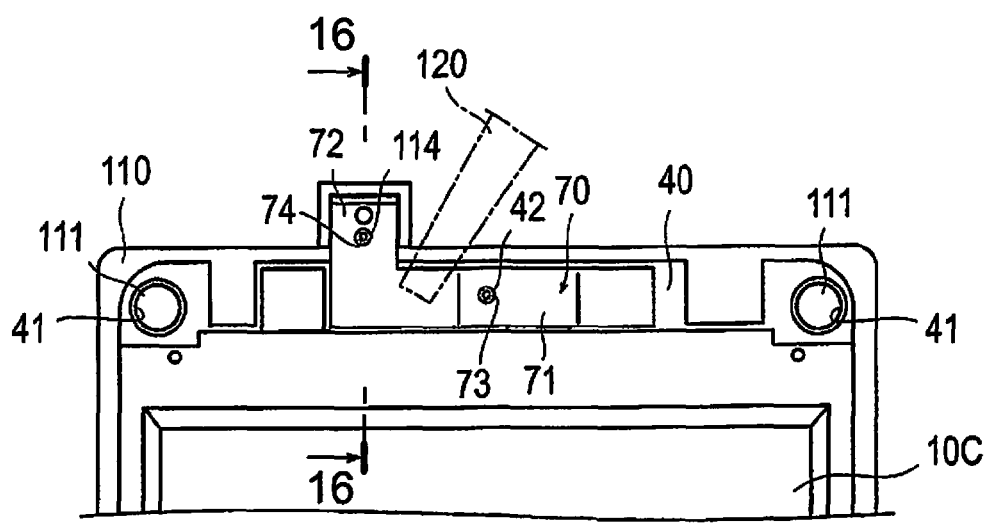
FIG. 15 is a partial plan view showing a state in which a bus bar has been placed onto a spacer by the bus bar placing part.
Figure 16:
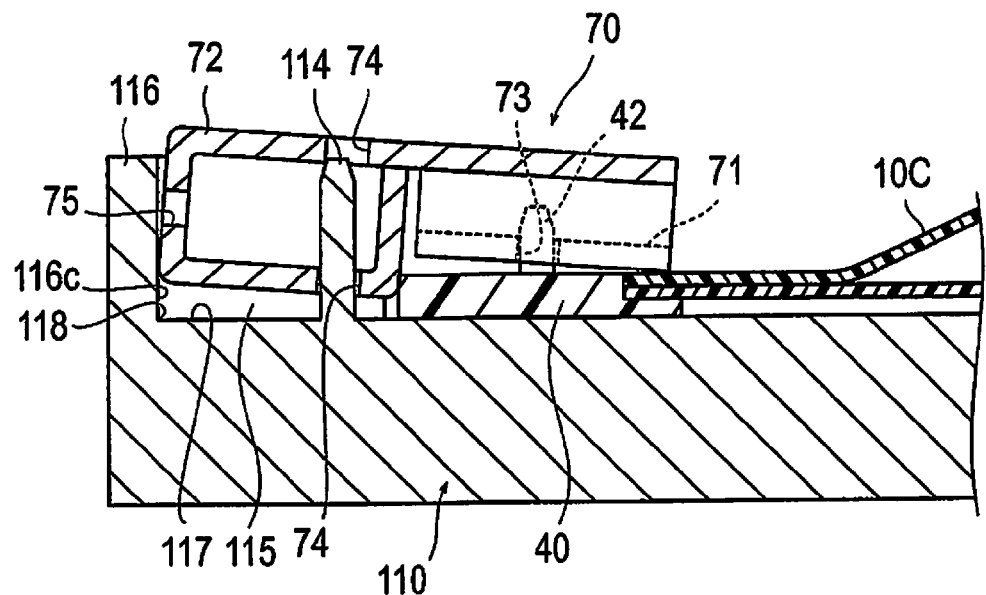
FIG. 16 is a cross-sectional view along line 16-16 of FIG. 15.

Next, the bus bar 70 is placed onto the spacer 40 by the bus bar placing part 120 as shown in FIGS. 15 and 16. In the placing step, the bus bar 70 is placed in a position where the first pin member 114 provided to the pallet 110 is inserted into the first pin hole 74 provided to the bus bar 70, whereby two surfaces face two wall surfaces in the bus bar positioning part 113. In the placing step, the bus bar 70 is placed in a position where the second pin member 42 provided to the spacer 40 is inserted into the second pin hole 73 provided to the bus bar 70, whereby two surfaces face two wall surfaces in the bus bar positioning part 113 In the positioning step performed after the placing step, the bus bar 70 is placed on the pallet 110 to an extent that the bus bar 70 can be pressed the pressing part 130 against the bus bar positioning part 113. During the placing step, the contact part 131 of the pressing part 130 is positioned higher than the spacer 40 and the battery 10C on the pallet 110.

Figure 17:
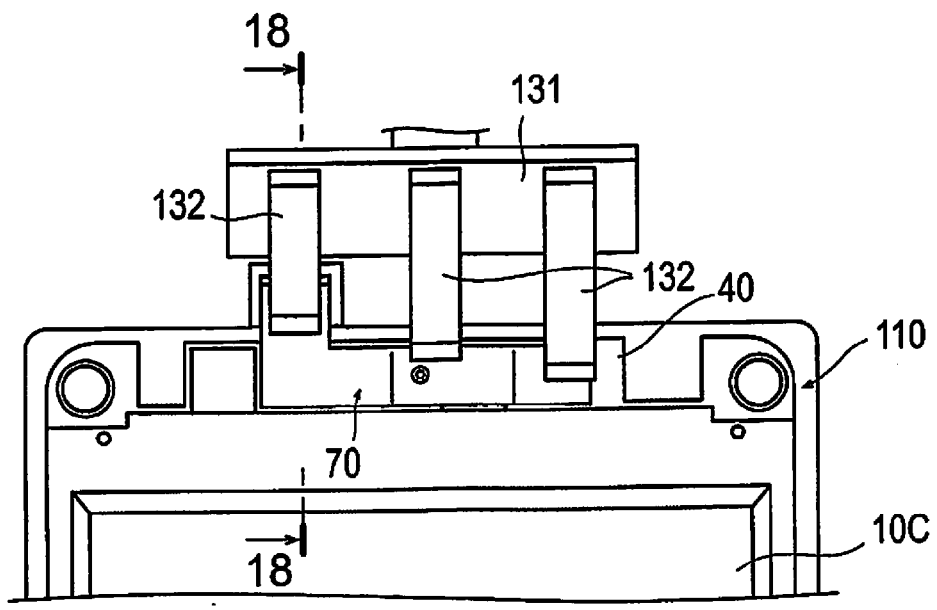
FIG. 17 is a partial plan view showing a state in which two adjacent surfaces in a bus bar are made by the pressing part to press against two adjacent wall surfaces in the bus bar positioning part, and the position of the bus bar relative to a battery is set.
Figure 18:
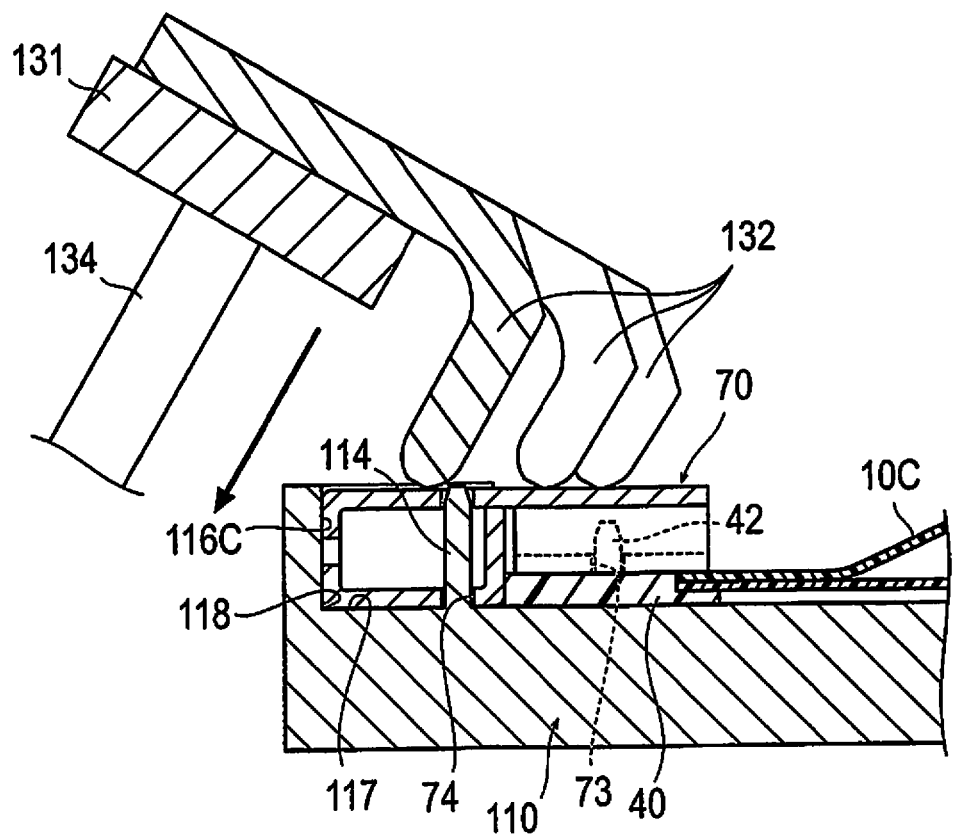
FIG. 18 is a cross-sectional view along line 18-18 of FIG. 17.

In the positioning step, the drive part 133 (see FIG. 7) is operated, causing the contact part 131, which extends above the pallet 110 from a position to the lateral direction Y relative to the conveying direction X of the pallet 110, to come in contact with the bus bar 70 and to be pulled in laterally and downward as shown in FIGS. 17 and 18, whereby two surfaces in the bus bar 70 are pressed against two wall surfaces in the bus bar positioning part 113 (refer to the arrow in FIG. 18). The bus bar 70, being pushed by the pawls 132 of the contact part 131, is thereby pressed toward the angle part 118 so as to come in contact with both the bottom surface 117 and the third side surface 116C which are adjacent, and the bus bar is positioned with high precision relative to the pallet 110. Because the spacer 40 has already been positioned with high precision relative to the pallet 110, the bus bar 70 is positioned with high precision relative to the pallet 110, and the bus bar 70 is positioned with high precision relative to the spacer 40 as well. At this time, the bus bar 70 is in contact with the negative electrode tab 15C of the battery 10C.

The bus bar 70 is then bonded by ultrasonic welding or the like to the negative electrode tab 15C of the battery 10C.

As described above, according to the present embodiment, the bus bar 70 is placed by the bus bar placing part 120 in a position where two surfaces face two wall surfaces (the first side surface 116A and the third side surface 116C, the second side surface 116B and the third side surface 116C, or the third side surface 116C and the bottom surface 117) in the bus bar positioning part 113, and the two surfaces are pressed by the pressing part 130 against the two wall surfaces in the bus bar positioning part 113 to set the position relative to the battery 10C. Because the function of placing the bus bar 70 and the function of positioning the bus bar 70 relative to the battery 10C are carried out by separate means or devices, when the bus bar 70 is placed in a position where two adjacent surfaces face two wall surfaces in the bus bar positioning part 113, the precision whereby the bus bar 70 is positioned relative to the pallet 110 may be comparatively low. Therefore, the bus bar 70 can be placed at a high speed, and the cost of equipment such as the robot placing the bus bar 70 can be reduced. Furthermore, because the two adjacent surfaces of the bus bar 70 are pressed against the two wall surfaces in the bus bar positioning part 113, the position of the bus bar 70 relative to the battery can be set with high precision. Therefore, the work of attaching the bus bar 70 to the battery can be done faster and made less expensive, and the bus bar 70 can be positioned relative to the battery 10C with high precision.

Particularly, there is complicated structure and control involved with extracting one bus bar 70 at a time with high precision from a plurality of bus bars placed in a tray or the like, but it becomes unnecessary to position the bus bar 70 with high precision when placing the bus bar onto the pallet 110, whereby the bus bar placing part 120 can be simplified in configuration and reduced in cost, and high-precision positioning by the pressing part 130 is made possible.

The pressing part 130 has a contact part 131 extending above the pallet 110 from a position in a lateral direction Y relative to the conveying direction X of the pallet 110, and the contact part 131 is brought in contact with the bus bar 70 and pulled laterally and downward, whereby two surfaces in the bus bar 70 press against two wall surfaces in the bus bar positioning part 113. Due to the pressing part 130 being disposed in the lateral direction Y, clearance is formed above the pallet 110, and the next conveyed battery 10C and bus bar 70 can be placed easily onto the pallet 110. In cases in which a pressing part is provided above the pallet 110, it has been necessary to increase the distance over which the pressing part retracts in order to guarantee a space for placing the battery 10C and bus bar 70 onto the pallet 110. Due to the pressing part 130 being disposed in the lateral direction Y, however, the distance over which the pressing part 130 retracts can be reduced, and it is possible to speed up the manufacture of the battery 10C by speeding up the operation of the pressing part 130.

The pallet 110 has the first pin member 114 inserted into the first pin hole 74 formed in the bus bar 70, and due to the bus bar 70 being placed by the bus bar placing part 120 in a position where the first pin member 114 is inserted into the first pin hole 74, two surfaces face two wall surfaces in the bus bar positioning part 113. It is thereby possible to set the bus bar 70 on the battery 10C to an extent such that the bus bar 70 can be pressed against the bus bar positioning part 113.

The battery 10C includes a spacer 40 laid over and attached to the negative electrode tab 15C, the spacer securing pin 111 settles the position of the battery 10C relative to the pallet 110 by setting the position of the spacer 40 relative to the pallet 110, and the bus bar placing part 120 places the bus bar 70 onto the spacer 40 of the battery 10C placed on the pallet 110. Even with a battery 10C provided with a spacer 40, the bus bar 70 can be positioned with high precision relative to the battery 10C.

The spacer 40 has a second pin member 42 inserted into the second pin hole 73 formed in the bus bar 70, and due to the bus bar 70 being placed by the bus bar placing part 120 in a position where the second pin member 42 is inserted into the second pin hole 73, two surfaces face two wall surfaces in the bus bar positioning part 113. It is thereby possible to set the bus bar 70 on the spacer 40 of the battery 10C to an extent such that the bus bar 70 can be pressed against the bus bar positioning part 113.

Modifications

The present invention is not limited to the embodiment described above, and can be modified as appropriate. For example, the bus bar placing part 120 is not limited to equipment such as a robot, and the configuration is not limited as long as it is capable of placing the bus bar 70. A battery 10C comprising a spacer 40 is depicted, but the present invention can also be applied to a battery 10C not comprising a spacer 40.

The number of pawls 132 of the contact part 131 is not limited to three. A plurality of pressing parts 130 may also be provided.

In the present embodiment, the bus bar 70 is positioned using two wall surfaces in the bus bar positioning part 113, but is not limited as such and can be positioned using any two or more wall surfaces from among the bottom surface 117, the first side surface 116A, the second side surface 116B, and the third side surface 116C. Therefore, the bus bar can be positioned using three wall surfaces, for example.

Figure 19:
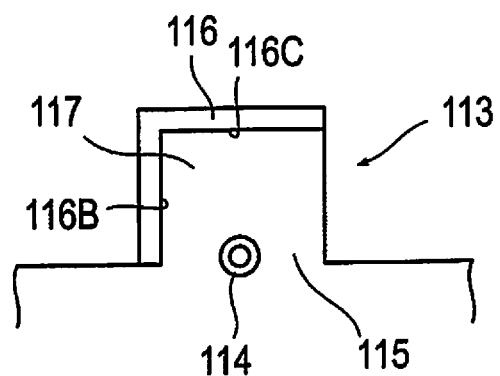
FIG. 19 is plan view showing a bus bar positioning part according to a modification.

The side wall 116 need not be formed into a substantial U shape. In the bus bar positioning part 113 according to the modification shown in FIG. 19, for example, the fitting part 115 has a substantially L-shaped side wall 116 rising up from the surface of the pallet 110 that carries the battery 10C, and a bottom surface 117 adjacent to the side wall 116. In the substantially L-shaped side wall 116, this portion is opened up without forming the first side surface 116A, and the second side surface 116B and third side surface 116C are formed. The second and second side surfaces 116B, 116C and the bottom surface 117 constitute wall surfaces in contact with the terminal part 72 of the bus bar 70. An angle part (similar to the "angle part 118" in FIGS. 9, 16, and 18) rising up at approximately 90 degrees is formed between the bottom surface 117 and the third side surface 116C. The bus bar positioning part 113 according to this modification comprises two adjacent wall surfaces (the second side surface 116B and the third side surface 116C, or the third side surface 116C and the bottom surface 117) which two adjacent surfaces in the bus bar 70 press against.

The bus bar attachment device and method according to the present embodiment may be applied also to the bus bars 60, 80 other than the bus bar 70.

The invention claimed is:
1. A bus bar attachment device comprising:
a pallet configured to have a battery positioned therein from which an electrode tab extends;
a battery positioning part configured to set a position of the battery relative to the pallet, the battery positioning part being disposed on the pallet;
a bus bar positioning part configured to set a position, relative to the pallet, of a bus bar to be electrically connected to the electrode tab, the bus bar positioning part being disposed on the pallet and having first and second adjacent wall surfaces configured to have first and second adjacent surfaces of the bus bar pressed thereagainst, respectively;

a bus bar placing part configured to place the bus bar onto the pallet in a position where the first and second adjacent surfaces face the first and second adjacent wall surfaces, respectively; and a pressing part configured to press the first and second adjacent surfaces in the bus bar placed by the bus bar placing part against the first and second adjacent wall surfaces, respectively, the pressing part configured to press the first and second adjacent surfaces against the first and second adjacent wall surfaces, respectively, so as to set the position of the bus bar relative to the battery, the first and second adjacent wall surfaces protruding from a surface of the pallet that is configured to be in contact with the battery.

2. The bus bar attachment device according to claim 1, wherein the pressing part has a contact part extending above the pallet from a position in a lateral direction relative to a conveying direction of the pallet, and being configured to bring the contact part in contact with the bus bar and pull the contact part in laterally and downwardly so as to cause the first and second surfaces in the bus bar to press against the first and second wall surfaces in the bus bar positioning part, respectively.

3. The bus bar attachment device according to claim 1, wherein the pallet has a first pin member inserted into a first pin member hole in the bus bar, and the bus part placing part is configured to place the bus bar in a position where the first pin member is inserted into the first pin member hole, whereby the first and second surfaces face the first and second wall surfaces in the bus bar positioning part, respectively.

4. The bus bar attachment device according to claim 1, wherein the bus bar positioning part has a U-shaped side wall rising up from a surface of the pallet on which the battery is to be placed, and has a tapered shape in which a taper extends from an inlet port opened in the side wall toward a side surface facing the inlet port.

5. The bus bar attachment device according to claim 1, wherein the battery has a spacer laid on and attached to the electrode tab, the battery positioning part is configured to set the position of the battery relative to the pallet by setting the position of the spacer relative to the pallet, and the bus bar placing part is configured to place the bus bar onto the spacer of the battery placed on the pallet.

6. The bus bar attachment device according to claim 5, wherein the spacer has a second pin member inserted into a second pin hole in the bus bar, and bus bar placing part is configured to place the bus bar being in a position where the second pin member is inserted into the second pin hole, whereby the first and second surfaces face the first and second wall surfaces in the bus bar positioning part, respectively.

7. A bus bar attachment method comprising:

placing, on a pallet, a battery from which an electrode tab extends out when a position relative to the pallet has been set;

placing a bus bar, which is electrically connected to the electrode tab, in a position where first and second adjacent surfaces in the bus bar face first and second adjacent wall surfaces in a bus bar positioning part, respectively, the bus bar positioning part being disposed on the pallet so as to set the position of the bus bar relative to the pallet; and positioning the first and second adjacent surfaces in the placed bus bar to press against the first and second adjacent wall surfaces in the bus bar positioning part to set the position of the bus bar relative to the battery, the bus bar positioning part being disposed on the pallet such that the first and second adjacent wall surfaces protrude from a surface of the pallet that is configured to be in contact with the battery.

8. The bus bar attachment method according to claim 7, wherein the positioning includes bringing a contact part extending above the pallet from a position in a lateral direction relative to a conveying direction of the pallet in contact with the bus bar and pulling the contact part in laterally and downwardly, whereby the first and second surfaces in the bus bar are pressed against the first and second wall surfaces in the bus bar positioning part, respectively.

9. The bus bar attachment method according to claim 7, wherein the placing the bus bar includes placing the bus bar being in a position where a first pin member disposed on the pallet is inserted into a first pin hole disposed on the bus bar, whereby the first and second surfaces face the first and second wall surfaces in the bus bar positioning part, respectively.

10. The bus bar attachment method according to claim 7, wherein the placing the battery includes setting a position of a spacer laid on and attached to the electrode tab of the battery relative to the pallet, whereby the position of the battery relative to the pallet is set, and the placing the bus bar includes placing the bus bar on the spacer of the battery placed on the pallet.

11. The bus bar attachment method according to claim 10, wherein placing the bus bar includes placing the bus bar in a position where a second pin member disposed on the spacer is inserted into a second pin hole disposed on the bus bar, whereby the first and second surfaces face the first and second wall surfaces in the bus bar positioning part, respectively.

12. The bus bar attachment device according to claim 2, wherein the pallet has a first pin member inserted into a first pin member hole in the bus bar, and the bus part placing part is configured to place the bus bar in a position where the first pin member is inserted into the first pin member hole, whereby the first and second surfaces face the first and second wall surfaces in the bus bar positioning part, respectively.

13. The bus bar attachment device according to claim 2, wherein the bus bar positioning part has a U-shaped side wall rising up from a surface of the pallet on which the battery is to be placed, and has a tapered shape in which a taper extends from an inlet port opened in the side wall toward a side surface facing the inlet port.

14. The bus bar attachment device according to claim 2, wherein the battery has a spacer laid on and attached to the electrode tab, the battery positioning part is configured to set the position of the battery relative to the pallet by setting the position of the spacer relative to the pallet, and the bus bar placing part is configured to place the bus bar onto the spacer of the battery placed on the pallet.

15. The bus bar attachment device according to claim 3, wherein the bus bar positioning part has a U-shaped side wall rising up from a surface of the pallet on which the battery is to be placed, and has a tapered shape in which a taper extends from an inlet port opened in the side wall toward a side surface facing the inlet port.

16. The bus bar attachment device according to claim 3, wherein the battery has a spacer laid on and attached to the electrode tab, the battery positioning part is configured to set the position of the battery relative to the pallet by setting the position of the spacer relative to the pallet, and the bus bar placing part is configured to place the bus bar onto the spacer of the battery placed on the pallet.

17. The bus bar attachment method according to claim 8, wherein the placing the bus bar includes placing the bus bar being in a position where a first pin member disposed on the pallet is inserted into a first pin hole disposed on the bus bar, whereby the first and second surfaces face the first and second wall surfaces in the bus bar positioning part, respectively.

18. The bus bar attachment method according to claim 8, wherein the placing the battery includes setting a position of a spacer laid on and attached to the electrode tab of the battery relative to the pallet, whereby the position of the battery relative to the pallet is set, and the placing the bus bar includes placing the bus bar on the spacer of the battery placed on the pallet.

19. The bus bar attachment method according to claim 9, wherein the placing the battery includes setting a position of a spacer laid on and attached to the electrode tab of the battery relative to the pallet, whereby the position of the battery relative to the pallet is set, and the placing the bus bar includes placing the bus bar on the spacer of the battery placed on the pallet.

\* \* \* \* \*